US008527938B2

(12) United States Patent
Bahrami et al.

(10) Patent No.: US 8,527,938 B2
(45) Date of Patent: Sep. 3, 2013

(54) WORKLET MODELING (75) Inventors: Ali Bahrami, Sammamish, WA (US); Changzhou Wang, Bellevue, WA (US)

(73) Assignee: The Boeing Company, Chicago, IL (US)

(*) Notice: Subject to any disclaimer, the term of this patent is extended or adjusted under 35 U.S.C. 154(b) by 2402 days.

(21) Appl. No.: 11/158,037

(22) Filed: Jun. 21, 2005

(65) Prior Publication Data

US 2006/0288330 A1    Dec. 21, 2006

(51) Int. Cl.
*G06F 9/44*    (2006.01)

(52) U.S. Cl.
USPC ............................ 717/104; 717/105; 717/120

(58) Field of Classification Search
None
See application file for complete search history.

(56) References Cited

U.S. PATENT DOCUMENTS

| | | | | |
|---|---|---|---|---|
| 7,174,534 | B2* | 2/2007 | Chong et al. | 717/105 |
| 7,451,432 | B2* | 11/2008 | Shukla et al. | 717/105 |
| 7,506,302 | B2* | 3/2009 | Bahrami | 717/100 |
| 7,565,640 | B2* | 7/2009 | Shukla et al. | 717/104 |
| 7,865,875 | B2* | 1/2011 | Hockenberry et al. | 717/120 |
| 2003/0036940 | A1* | 2/2003 | Leymann et al. | 705/8 |
| 2003/0115311 | A1* | 6/2003 | Johnston-Watt et al. | 709/223 |
| 2004/0019494 | A1* | 1/2004 | Ridgeway et al. | 705/1 |
| 2004/0078777 | A1* | 4/2004 | Bahrami | 717/105 |
| 2004/0083448 | A1* | 4/2004 | Schulz et al. | 717/104 |
| 2005/0005259 | A1* | 1/2005 | Avery et al. | 717/103 |
| 2005/0071209 | A1* | 3/2005 | Tatavu et al. | 705/7 |
| 2005/0097061 | A1* | 5/2005 | Shapiro et al. | 705/67 |
| 2005/0192783 | A1* | 9/2005 | Lystad et al. | 703/3 |
| 2005/0204333 | A1* | 9/2005 | Denby et al. | 717/104 |
| 2005/0222851 | A1* | 10/2005 | Dubey et al. | 705/1 |
| 2005/0235356 | A1* | 10/2005 | Wang | 726/22 |
| 2006/0074714 | A1* | 4/2006 | Aziz et al. | 705/2 |
| 2006/0161615 | A1* | 7/2006 | Brooks et al. | 709/201 |
| 2006/0195817 | A1* | 8/2006 | Moon | 717/104 |
| 2006/0242279 | A1* | 10/2006 | Chen et al. | 709/221 |
| 2008/0127047 | A1* | 5/2008 | Zhang et al. | 717/104 |
| 2009/0125884 | A1* | 5/2009 | Hsu et al. | 717/120 |
| 2011/0219354 | A1* | 9/2011 | Zhang et al. | 717/104 |
| 2012/0023508 | A1* | 1/2012 | Flores et al. | 717/120 |
| 2012/0291012 | A1* | 11/2012 | Robison et al. | 717/120 |

OTHER PUBLICATIONS

Cherniack et al., "Expressing User Profiles for Data Recharging", Aug. 2001 IEEE, pp. 6-13.*
Bahrami et al., "The Workflow Based Architecture for Mobile Information Access in Occasionally Connected Computing", 2006 IEEE, pp. 1-8.*
Freβmann et al., "Towards Collaborative Agent-based Knowledge Support for Agile Projects", Apr. 2005, KMDAP 2005, pp. 1-6.*

(Continued)

*Primary Examiner* — Thuy Dao
*Assistant Examiner* — Ben C Wang (57) ABSTRACT

A processor, a method, and a program executable by a processor and residing on a machine readable memory are each configured to define work phases achieved at the direction of a person in interaction with a computing device. A first program component is configured to divide the work phase performed into at least one work object and at least one transition object. The worklet object has a boundary and includes at least one input data class, and at least one output data class, and at least one act upon the at least one input data class to produce the at least one output data class. The transition object is configured to include a decision gate succeeding each work phase. The decision gate configured to allow progress out of the boundary upon satisfaction of a boundary condition.

20 Claims, 5 Drawing Sheets

(56) References Cited

OTHER PUBLICATIONS

Freβmann et al., "Towards Collaborative Agent-based Knowledge Support for Time-critical and Business-critical Processes", Apr. 2005, KMDAP 2005, pp. 1-11.*

Althoff et al., "Professional Knowledge Management", Apr. 10-13, 2005, WM 2005, pp. 1-20.*

Kambalakatta et al., "Profile based Caching to Enhance Data Availability in Push/Pull Mobile Environment", Sep. 3, 2004, IEEE, pp. 1-10.*

Adams et al., "Worklets: A Service-Oriented Implementation of Dynamic Flexibility in Workflows", 2006 Springer-Verlag Berlin Heidelberg, OTM 2006, LNCS 4275, pp. 291-308; <http://link.springer.com/content/pdf/10.1007%2F11914853_18.pdf>.* van der Aalst et al., "YAWL: yet another workflow language", 2004 Elsevier Ltd., pp. 245-275; <http://www.sciencedirect.com/science/article/pii/S0306437904000304>.*

Chen et al., "A Model Driven Visualization Platform for Workflow", 2010 ACM, VINCT'10, Sep. 28-29, 2010, Beijing, China, pp. 1-6; <http://dl.acm.org/citation.cfm?doid=1865841.1865857>.*

Biresaw et al., "A Bayesian Network for Online Evaluation of Sparse Features Based Multitarget Tracking", 2012 IEEE, pp. 429-432; <http://ieeexplore.ieee.org/stamp/stamp.jsp?tp=&arnumber=6466888>.*

Chandrsekaran, et al.; TelegraphCQ; Continuous Dataflow Processing for an Uncertain World; Intel Berkeley Laboratory, IBM Almaden Research Center; University of California, Berkeley; 2003.

Chandrsekaran, et al.; Remberance of Streasms Past: Overload-Sensitive Management of Archived Streams; 30th VLDB Conference, Toronoto, Canada 2004.

Krishnamurthy, et al.; the Case for Precision Sharing; 30th VLDB Conference, Toronoto, Canada 2004.

* cited by examiner

WORKLET MODELING

FIELD OF THE INVENTION

This invention relates generally to network connectivity and, more specifically, to data transfer over a connective network.

BACKGROUND OF THE INVENTION

Mobility has become the most recent paradigm dictating design of digital devices including processors with computing capability. A mobile device generally requires two resources to function: power and data. To supply power and data, rather than to keep the mobile device continually connected to fixed power and data grids (e.g., the Internet), mobile devices cope with disconnection from these grids by "caching." Mobile devices may use rechargeable batteries for caching power, while local storage is used for caching data. Periodically, however, the device caches must be "recharged" by connection with fixed power and data grids. With existing technology, however, the process of recharging the device data cache is much more cumbersome and error-prone than recharging the power cache.

In contrast to recharging the power cache, recharging the data may be relatively inefficient and time consuming. While power will seek underpowered cells by virtue of relations of voltages, recharging a data cache is generally much less directed and often requires complete resynchronizing of all data in the data cache. Alternately, recharging of the data cache may occur upon a user's selection of data with which to recharge the cache.

As with power recharging, the recharging of a data cache requires "plugging in" a device to the network, meaning the initiation of communication with a network server according to the parameters of a network link. While such recharging may occur through connection to the network by means of a link enabled by a physical connection, such as an Ethernet connection, in the following discussion, all recharging connections will be referred to as wireless connections in that wireless connections suffer all of the limitations of physical connections in addition to limitations peculiar to wireless connection technology. For this reason, wireless connection is considered the general type of connection case, and physical connections are the specific case.

Using a wireless connection capability, mobile devices such as web-phones, personal digital assistants, palmtop computers (e.g. Pocket PCs, etc.), and laptop computers must access and recharge their internal data caches. Each of these wireless devices are configured to travel from one place to another place while wireless access points are generally both fixedly located and broadcast with a very limited area of broadcast coverage. As a result of these two factors, the wireless devices travel into and out of connectivity with any single wireless access point. For this reason, resulting changing in duration and quality of a wireless connection dictate that data be synchronized according to opportunities afforded by the connection.

Additionally, synchronization of data often requires the rewriting of large files or sets of files over older copies of the files according to a direction of a synchronization log rather than to select according to the anticipated information needs of the individual. Divergence between which files have changed and which files will be needed can often greatly increase the number of files that will be overwritten and such a synchronization requirement will tend to make the files most necessary to the individual fall in random placement through the queue of files to be overwritten. The rewriting currently tends to be indiscriminate or only coarsely discriminates such that when a change is made in a database, all related flat files are transferred in order to exploit the opportunity for communication afforded by changing connection (connected and disconnected) and bandwidth of the selected mode of communication.

There is an unmet need in the art for an adaptive means of prioritizing the transfer or synchronization of data between a mobile device and a server according to the needs of a user based upon patterns of use recorded in a user profile.

SUMMARY OF THE INVENTION

The present invention is directed to systems and methods for selective data transfer over an intermittent network. Embodiments of systems and methods in accordance with the present invention may advantageously provide intelligent and look-ahead means of prioritizing the transfer or synchronization of data between a mobile device and a server according to the needs of a user, and which may be recorded in a user profile.

In one embodiment, a processor, a method, and a program executable by a processor and residing on a machine readable memory are each configured to define work phases achieved at the direction of a person in interaction with a computing device. A first program component is configured to divide the work phase performed into at least one work object and at least one transition object. The worklet object has a boundary and includes at least one input data class, and at least one output data class, and at least one act upon the at least one input data class to produce the at least one output data class. The transition object is configured to include a decision gate succeeding each work phase. The decision gate configured to allow progress out of the boundary upon satisfaction of a boundary condition.

BRIEF DESCRIPTION OF THE DRAWINGS

Embodiments of the present invention are described in detail below with reference to the following drawings.

DETAILED DESCRIPTION

The present invention relates to modeling work in order to exploit the models for intelligent caching of data by transmission over an intermittent network. The modeling allows transmission according to anticipated needs of an operator. Many specific details of certain embodiments of the invention are set forth in the following description and in FIGS. 1, 2, 3, 4, and 5 to provide a thorough understanding of such embodiments. One skilled in the art, however, will understand that the present invention may have additional embodiments, or that the present invention may be practiced without one or more of the details described in the following description.

Webster's Dictionary defines work as physical or mental effort or activity directed toward the production or accomplishment of something. Alternatively, work as a noun is defined as something that has been produced or accomplished through the effort, activity, or agency of a person or thing. A method, processor, and computer program directed at recharging data caches in mobile devices, the mobile devices being directed at facilitating work or the production of work, advantageously exploits accomplishment of phases of work as a metric for determining a priority for communication a data segment. Such phases of work are described as worklets throughout this patent.

A worklet is a phase of work and as programmed in a modeling language is an object configured to quantify relevant work that people accomplish. The work specifically is work on computing devices such as mobile devices. The worklet will be associated with what tools people use to accomplish the work, the input data, and the artifacts or output data the people using the computing device create. The definition of any worklet is based upon the phase of work described and is independent of underlining work processes used to accomplish that phase of work. A worklet object includes a boundary or a boundary condition and which is associated with a transition object. The transition object includes a decision gate admitting the accomplishment of the phase of work within the boundary and when the boundary condition is satisfied, allows the process to commence the next worklet or phase of work. Otherwise, where the boundary condition is not met, the process will continue work in the current phase or worklet.

The underlying work processes used to accomplish that phase of work include but are not limited to assistlets associated with the phase of work or worklet. An assistlet is an executable program component that is tightly configured to perform a defined task such as "retrieve email," "prepare a new document according to a template," or "save the document." Elements of a work phase are accomplished by assistlets, the assistlets being configured to perform repeatable subdivisions of the work phase. Assistlets are defined to be suitably configured for completion of a defined work phase element.

A practical distinction between worklets and assistlets is that worklets are defined phases of work and are independent of the actual means that cause the phase of work to be accomplished. Assistlets are the individual executable program components that are currently selected to accomplish the worklet. As there may be several distinct and suitable means including the assistlets that will accomplish the phase of work or worklet, programmers select a most suitable ordered series of assistlets and associate that most suitable ordered series of assistlets with the worklet to allow accomplishment of the worklet. When a more suitable ordered series of assistlets becomes known or is configured, the programmer associates the new more suitable series of assistlets with the worklet in lieu of the earlier suitable ordered series of assistlets.

Figure 1:
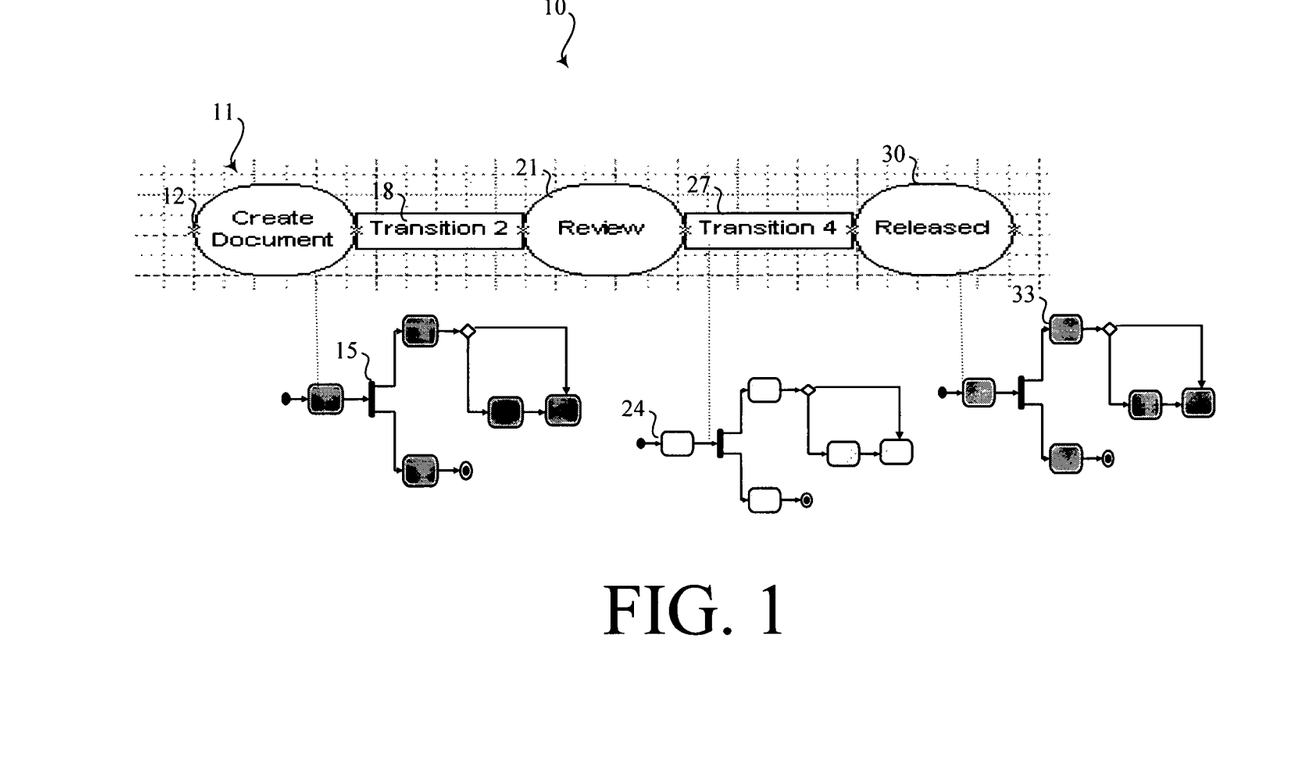
FIG. 1 is a block diagram of a process in accordance with an embodiment of the invention.

The relationship between worklets, assistlets, and underlying processes is better understood with reference to FIG. 1, a process 10 to publish a document is shown. In this embodiment, a first worklet 12 contains a work phase or worklet deemed "create document." The first worklet 12 may be accomplished through a first ordered series of assistlets or first method 15 that is represented as a flowchart. To accomplish the first worklet 12, a number of assistlets have been configured to form the first method 15 and may include such interactions with the operator such as, by way of non-limiting example, supplying a password to allow access to a server on the intermittent network link (not shown). Similarly, the first method might include steps such as "insert CD ROM." The actions of the computing device are defined by the ordered series of assistlets.

Importantly, the first worklet 12 is not necessarily accomplished by the first method 15 but the worklet is an abstraction of any suitable method having an ordered series of assistlets to accomplish the work phase, in the case of the first worklet 12 deemed "create document" those assistlets and operator interactions might currently be accomplished by the first method 15.

Any worklet, including the first worklet 12, a second worklet 21, and a third worklet 30, are not uniquely linked to the first method 15, a second method 24, and a third method 33. Rather, worklets may be defined in terms of a class of input data required, a class of output data produced, and the phase of work accomplished. Worklets are states of work or phases of work. Worklets are centered on people who perform work and are a means of defining the work they perform. Given a suitable lexicon of worklets, the daily tasks of persons interacting with a computer are readily catalogued and observed.

That each worklet is currently but not necessarily accomplished according to the methods 15, 24, and 33 inherently allows flexibility in selecting alternative methods. Substituting an equally or more suitable method for any one of the methods 15, 24, or 33 will not compromise the defining of a worklet so long as the same phase of work is accomplished upon data belonging to the class of input data to produce data belonging to the class of output data. By such a means, a phase of work may be accomplished by any of several commercially available or custom executable programs resident on the mobile device and yet be encompassed by a boundary of the worklet 12, 21, 30.

A worklet model 11 is included in the process 10 to publish a document. The worklet model 11 is a string of the first worklet 12, the second worklet 21, and the third worklet 30 joined at interstices by a first transition object 18 and a second transition object 27. Not shown is a third transition object that may be used to terminate the third worklet 30, but its presence may be presumed in the diagram. The exemplary worklet model 11 is useful as a further abstraction for either programming operations of a processor or for observing operations of a processor while running in a background state thereby to define the work the processor is performing at the bidding of a user. Assistlets are composed based upon the worklet model 11.

Figure 2:
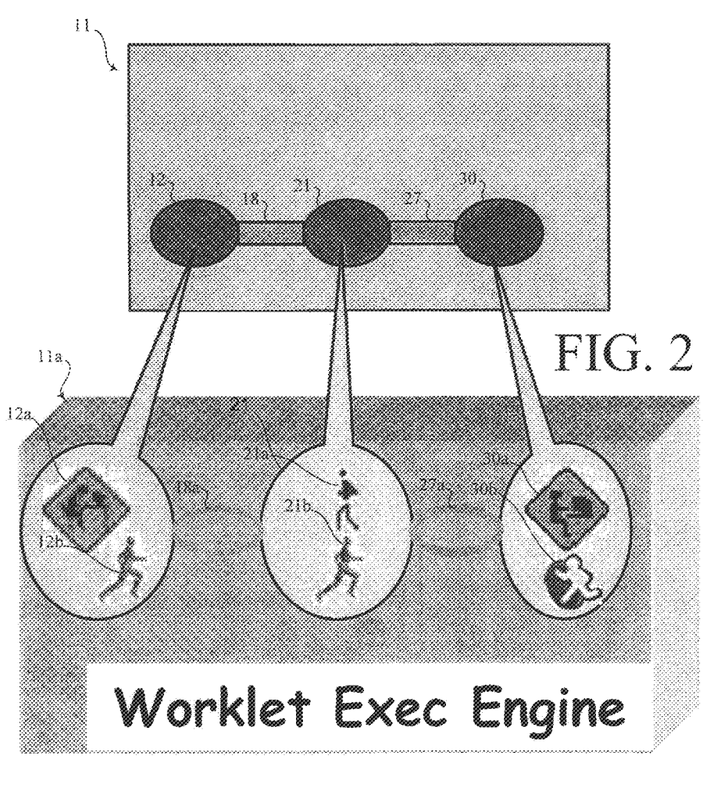
FIG. 2 is a block diagram of a worklet execution engine in accordance with another embodiment of the invention.

The role of the worklet 12, 21, and 30 in accomplishing repeatable tasks is further shown in reference to FIG. 2. Assistlets, such as an assistlet configured to achieve worklets 12, 21, and 30, may be executed as scripts in a worklet execution engine 11a according to the currently associated methods 15, 24, or 33 (FIG. 1). Advantageously, the worklet execution engine 11a allows programming of worklet models 11 by graphic means. Thus, suitable selection of the first worklet 12 invokes the placement of a first icon 12a and a second icon 12b to form an order pair thus forming the currently corresponding first method 15 (FIG. 1). The first worklet 12 generates, therefore a first component of an executable assistlet script executing the two assistlets that first icon 12a and the second icon 12b in order represent.

Similarly the second worklet 21 invokes the selecting the third icon 21a and the fourth icon 21b to generate a second component of the script. While an ordered pair of assistlets represented by the third icon 21a and the fourth icon 21b are set forth in this non-limiting example. As shown by the representative flowchart that represents the method 15 (FIG. 1), the ordered series of assistlets may be very complex including decision gates and multiple paths for execution. The non-limiting example also demonstrates the ease of programming by using the selectable icons to choose and order the assistlets to form the method 15 (FIG. 1).

Again, the selecting of the third worklet 30 includes assistlets represented by a fifth icon 30*a* and a sixth icon 30*b*. The first transition object 18 is used to connect the first worklet 12 to the second worklet 21 by placing a first transition icon 18*a* between the first icon 12*a* and the second icon 21*a*. Similarly, placement of a second transition icon 27*a* between the third icon 30*a* and the second icon 21*a* invokes the connection of the second worklet 21 to the third worklet 30, thereby to form the first assistlet and to enable graphical programming of the script that accomplishes the first task.

One embodiment includes means to associate with worklets 12, 21, and 30 and transition objects 18, 27, a number of assistlets by configuring existing assistlets drawn from a library of assistlets. Thus, where, by way of non-limiting example, a worklet is configured as the phase of work "retrieving email" and includes a first assistlet configured to draw email from a first email address on a first server, a new assistlet can be configured from the first assistlet by changing the first email address on the first server to a second email address on a second server. So configured, the assistlet suitably accomplishes a distinct task while suitably performing the defined worklet.

Figure 3:
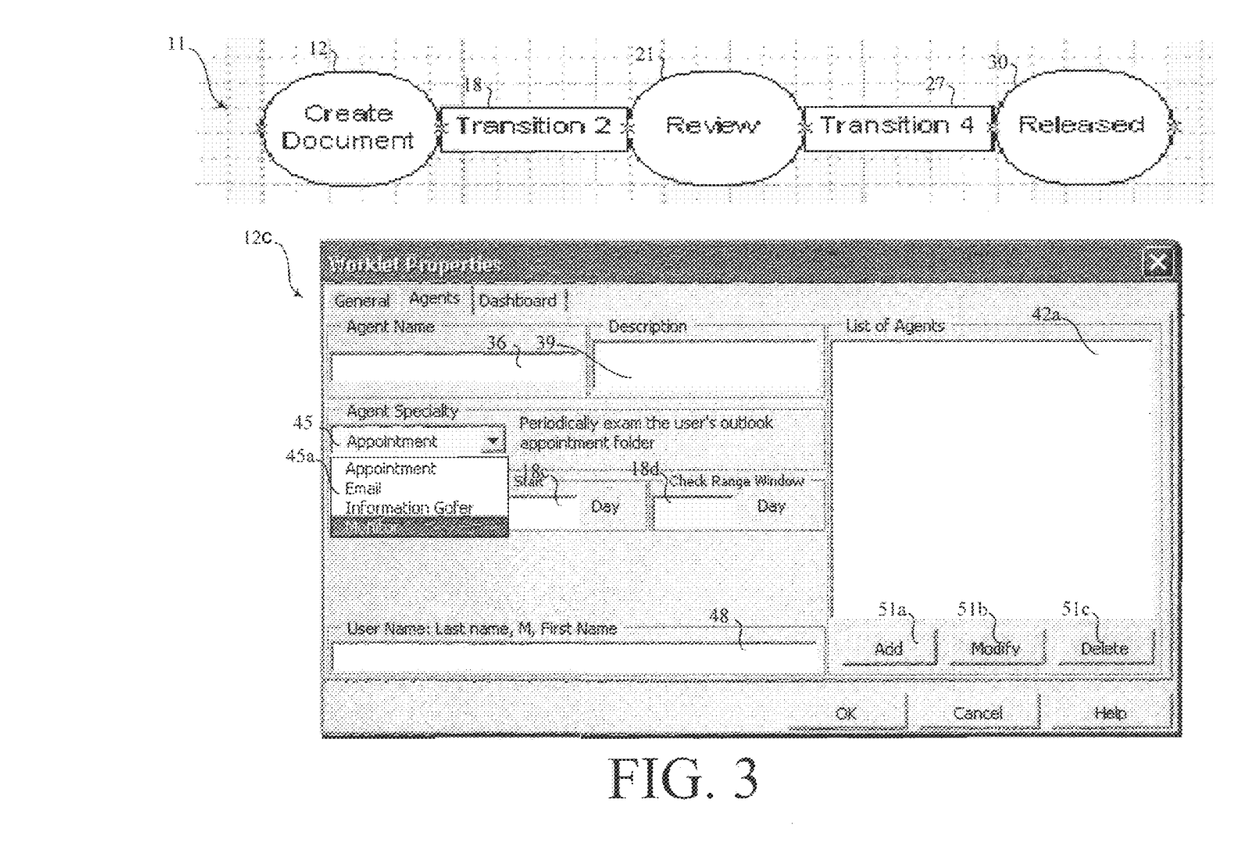
FIG. 3 is a dialogue box configured to edit a worklet in accordance with a further embodiment of the invention.

By way of example as shown in FIG. 3, in one embodiment of the invention, the first worklet 12 may be programmed to includes a number of assistlets (identified as an agent in FIG. 3) by means of a worklet dialog box 12*c*. The worklet dialog box 12*c* includes an opportunity to name a suitably modified assistlet in a fill-in window 36, and to include a description in a description fill-in window 39. The worklet 12 may be associated with various assistlets by modifying an existing assistlet selected from a list of assistlets appearing in an assistlet window 42*a* and suitable interaction with the worklet dialogue box 12*c*.

Classes of assistlets may be defined according to an assistlet specialty that occurs in the assistlet specialty window 45. For example, the instant embodiment shown in FIG. 3 further facilitates the programming of the worklet 12 by filling in the specialty window 45 according to a specialty selected from a drop-down list 45*a*. To associate the worklet 12 with a particular user profile, a user name fill-in window 48 facilitates the creation and exploitation of a user profile associated with a user designated in the user name fill-in window 48.

The worklet dialog box 12*c* further facilitates exploitation of the relationship between worklets and assistlets by including buttons, such as an "add" button 51*a* which when activated adds an assistlet as configured according to the windows 36, 39, 45, and 48 when a selected worklet is highlighted in the assistlet window 42*a*. A "modify" button allows editing of an existing worklet 12 by activation of the "modify" button when a selected worklet is highlighted in the assistlet window 42*a*. Additionally, a "delete" button 51*c* allows removal of outdated worklets 12 when a selected worklet is highlighted in the assistlet window 42.

The architecture of a software embodiment will now be described with reference to FIG. 4. As the definition of the worklets 12, 21, 30 (FIG. 1) allows recognition of the work, a model driven architecture becomes an appropriate environment for an embodiment. The model driven architecture may recognize achievement of the worklets 12, 21, 30 (FIG. 1) based on a platform-independent worklet model 11. A modeling framework 57 is suitably selected to generate code that will be executable by a processor (not shown) of a particular mobile device 66 with which adaptive data transfer is sought.

The modeling framework 57 allows a "common ground" environment such that relations between worklet models 11 are preserved as code is developed for the processor. The worklet model 11, along with interface definition sets that describe how the worklet model 11 is implemented on a different middleware platform, enable the modeling framework 57 to generate code suitable for a processor (not shown) in a mobile device 66 to execute.

The modeling framework 57 is selected to provide a suitable environment to create assistlets to be stored in an assistlet library 42, then in turn to use the assistlets to create the worklet model 11. Understanding that worklets 12, 21, 30 (FIG. 1) are a construct used to track achievement of work, the worklet 12, 21, 30 (FIG. 1) is defined independently of the process that is used to achieve the work. For that reason, the worklet 12, 21, 30 (FIG. 1) may be recognized according to the phase of work it accomplishes and the data it implicates in accomplishing that phase of work. As such, quanta of work accomplished become recognizable by comparison to defined worklets 12, 21, 30 (FIG. 1) or assistlets.

The modeling framework 57 may focus on the functionality and behavior of a distributed application or system, not the technology in which it will be implemented. The modeling framework 57 enables the worklet model 11 and the functions the worklet model 11 entails, to be divorced from implementation details. Thus, the process of modeling work need within the modeling framework 57 may not need to be repeated due to an update or substitution of software performing the work. Mapping a worklet model 11 to the processor (not shown) of a particular mobile device 66, the modeling framework 57 may implement translational tools, thereby easing the task of supporting new or different technologies.

Other considerations include the ease of working with the modeling framework 57, and the breadth of the library of assistlets. As such, the modeling framework 57 may allow real time code generation of worklets, and a worklet handling environment for building assistlets, associating assistlets with suitable worklets, and ordering assistlets to build applications to achieve the worklet model 11. The modeling framework 57 provides tools and runtime support to produce a set of classes for the model, a set of adapter classes that enable viewing and command-based editing of the model, and a basic editor.

Configured as the operating environment, the modeling framework 57 provides a command framework, including a set of generic command implementation classes for building editors. Finally, the modeling framework 57 generates an editor for the worklets 12, 21, 30 (FIG. 1), the editor including the worklet dialog box 12*c*. The generated editor may be configured to allow the suitable retrieval of assistlets, facilitating assistlet modification and associating the assistlet into more specific assistlet chains for achieving worklets.

A suitable modeling framework 57 includes a modeling language that is suitably granular in description of work. As noted above, work may be defined as a collection of work states or worklets 12, 21, 30 (FIG. 1), instead of states of an object flowing through the system. Many of the current modeling languages such as UML or IDEF have inherent flexibility that makes meaningful precise definition of work phases very difficult. Using more flexible modeling languages risks mixing different levels of granularity of knowledge. For suitable implementation of an embodiment, a modeling language is under constrained risks defining work with a lack of precision, which may make the prediction of needs of the work difficult.

Because a worklet is a phase of work performed by people in interaction with a computing device, people achieve worklets without modeling the worklets. Modeling the worklets allows for recognition of the work people perform in order to suitably represent that work. Important in the understanding of the definition of the worklets is that they are defined to conform to the achievement of work by a person rather than to define the work according to a manner that is most expeditious for the computing device. Thus, as a person performs work, observation of the phase of work the person performs suitably defines the worklets that taken together represent the person's performance of work. Allowing software with access to worklet definitions to reside and execute in an abstract layer as the person directs the processor to perform work, the software can, by comparison to the work performed to worklet definition, catalogue all of the work performed and place that catalogue in association with an identity of the user to form a user profile 60.

Suitably selecting the modeling framework 57 based upon a language configured to express phases of work and the transitions may force the separation of work practices from work processes. Worklet recognition scripts distinct from assistlets are defined in an abstract layer to reside on top of work processes 54. Therefore, the worklet model 11 can be associated to the processor-specific assistlets that, in turn, represent the detail steps of worklet executions. Worklet recognition occurring in the abstract layer collectively forms the generation of a user profile 60 and worklet modeling.

The user profiles 60 used for data recharging contain various types of information. For example, the profile 60 may describe the types of data that are of interest to a user. This description may be declarative in nature, so that it can encompass newly created data in addition to existing data. The description may also be flexible enough to express predicates over different types of data and media. Alternately, because of limitations on bandwidth, device-local storage, and recharging time, only a bounded amount of information typically can be sent to a device during data recharging communication opportunity. Thus, the profile may also express the user's preferences in terms of priorities among data items, desired resolutions of multi-resolution items, consistency requirements, and other properties. Finally, user context can be dynamically incorporated into the recharging process by parameterizing the user profile with information obtained from the device-resident applications, such as a calendar, a contact list, a "To Do" list, and other types of device-resident applications.

Figure 4:
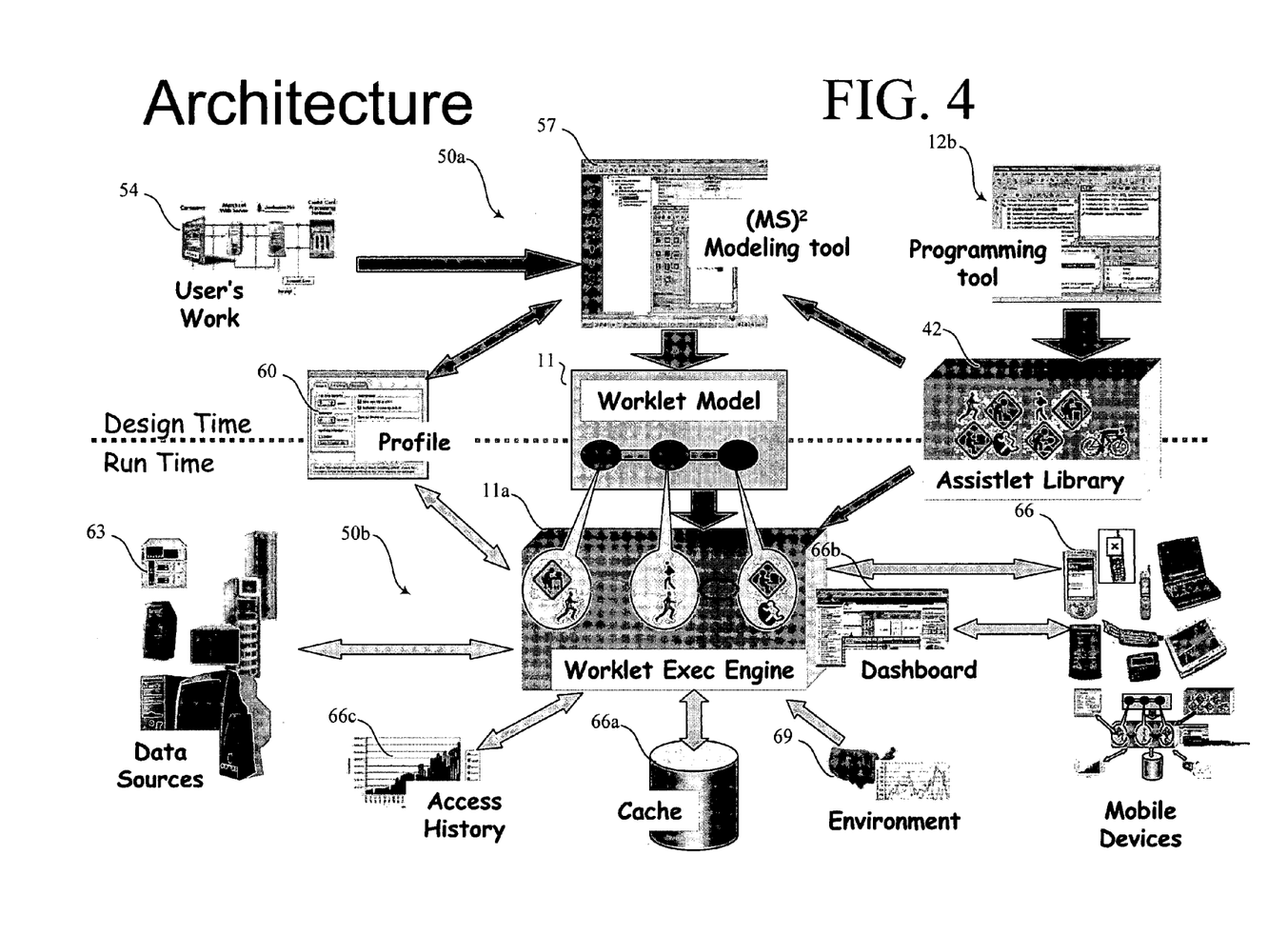
FIG. 4 is a block diagram of a computer software modeling architecture in accordance with yet another embodiment of the invention; and, FIG. 5 is a block diagram of a processor in accordance with an embodiment of the invention.

As is evident in FIG. 4, the software architecture comprises a design time environment 50a and a run time environment 50b. The design time environment 50a is configured to facilitate configuring of worklets 12, 21, 30 (FIG. 1) by means of the worklet dialog box 12c (FIG. 3). A profile 60 may be configured in light of identified data sources 63, and may specify one or more capture preferences, and collection and aggregations policies. Additionally, the run time environment 50b is configured to facilitate layout of a dashboard 66b used to report observed execution of worklets at the processor (not pictured) within the mobile device 66.

Within the run time environment 50b, a worklet execution engine 11a controls and observes the flow of worklets 12, 21, 30 (FIG. 1) as well as executing assistlets when a worklet is evoked. The assistlet library 42 contains specialized assistlets that are configurable in both the design time environment 50a and in the run time environment 50b. The worklet execution engine 11a may be used to observe the processor executing worklets in specialized assistlets to accumulate a worklet execution history and to analyze the accumulated worklet execution history along with input data sources and the output data paths or it may serve as the processor itself in executing or ordering execution of associated assistlets.

The worklet execution engine 11a may be configured to model and capture work in a flexible and adaptable manner independent of work processes, especially in situations that work is not highly transactional. By virtue of the worklet model 11, the worklet execution engine is enabled to aggregate an access history 66c and present that history on the dashboard interface 66b. The dashboard interface 66b may be configured to recognize the multiple roles of individuals in developing the several user profiles, and may be used to align information content with achievement of work and individual personal patterns.

Thus, the worklet execution engine 11a may support capturing what information people use, when, where and why to use the information in the achievement of discretely defined worklets 12, 21, 30 (FIG. 1); may support recognition of work artifacts people created at each phase of work or worklet 12, 21, 30 (FIG. 1); and may support documenting what tools they use, in what circumstances, and how they use it.

The worklet execution engine 11a may recognize work flow by at least two means. As discussed above, worklet recognition scripts may be executed in an abstract layer to reside on top of work processes 54 and there to observe their execution recognizing worklets 12, 21, 30 (FIG. 1), as they are achieved. Secondly, macros that invoke the execution of worklets 12, 21, 30 may readily be programmed into the operating system or into such programs as the processor may execute in order to allow invocation of the macros at will. In such situations, the invocation of the macro will also trigger a recognition of execution of the relevant worklet 12, 21, 30.

Because the worklets 12, 21, 30 (FIG. 1) are associated with a class of input data and a class of output data, and by knowing the executed worklets 12, 21, 30 (FIG. 1), the worklet execution engine 11a knows the data accessed and the source of the data. The access history 66c is suitably modified to reflect the execution of worklets 12, 21, 30 (FIG. 1). By collecting the access history, data from various sources may be given priority as the worklet execution engine 11a recharges the data cache 66a resident locally on the mobile device 66. Understanding that, by way of non-limiting example, where the worklet execution engine 11a retrieves an access history rich in examples of retrieving email from an Exchange™ server 63, the worklet execution engine 11 prioritizes Exchange™ data over other less used data for transfer over the intermittent network during times of transmission for storage in the data cache 66a.

Knowledge of other factors may allow the worklet execution engine 11a to enhance the efficacy of the recharging the data cache 66a. For instance, where access to an automated daytime planner is possible, recognizing patterns of worklets and the corresponding data access events recorded in the access history 66c that occur with regularity, such as before a partner's meeting at a business or before a sales appointment for a salesman, the worklet execution engine 11a may suitably rank files for data recharge.

The worklet execution engine 11a uses the recognition of workflow, through stringing of worklets 12, 21, 30 (FIG. 1), together with a user's access history 66c stored in a user profile, along with an environment 69, placing each of the user's actions in context. Thus, where an access point used to establish a wireless connection, known to be located at an airport, the worklet execution engine 11a exploits this knowledge of the user environment 69 along with access history 66c and the personal profile 60 to decide that worklets 12, 21, 30 (FIG. 1) that had previously been invoked by the work processes 54 at airports are more likely to be invoked again presently.

What is disclosed is Worklets 12, 21, 30 (FIG. 1) may be used to recognize and record phases of work and the execution of those phases of work. Recognition of phases of work along with attendant data needs allows prediction of data needed to accomplish work by prediction of the work to be done. As set forth above, the worklet execution engine 11*a* facilitates that recognition by means of worklet definition.

Figure 5:
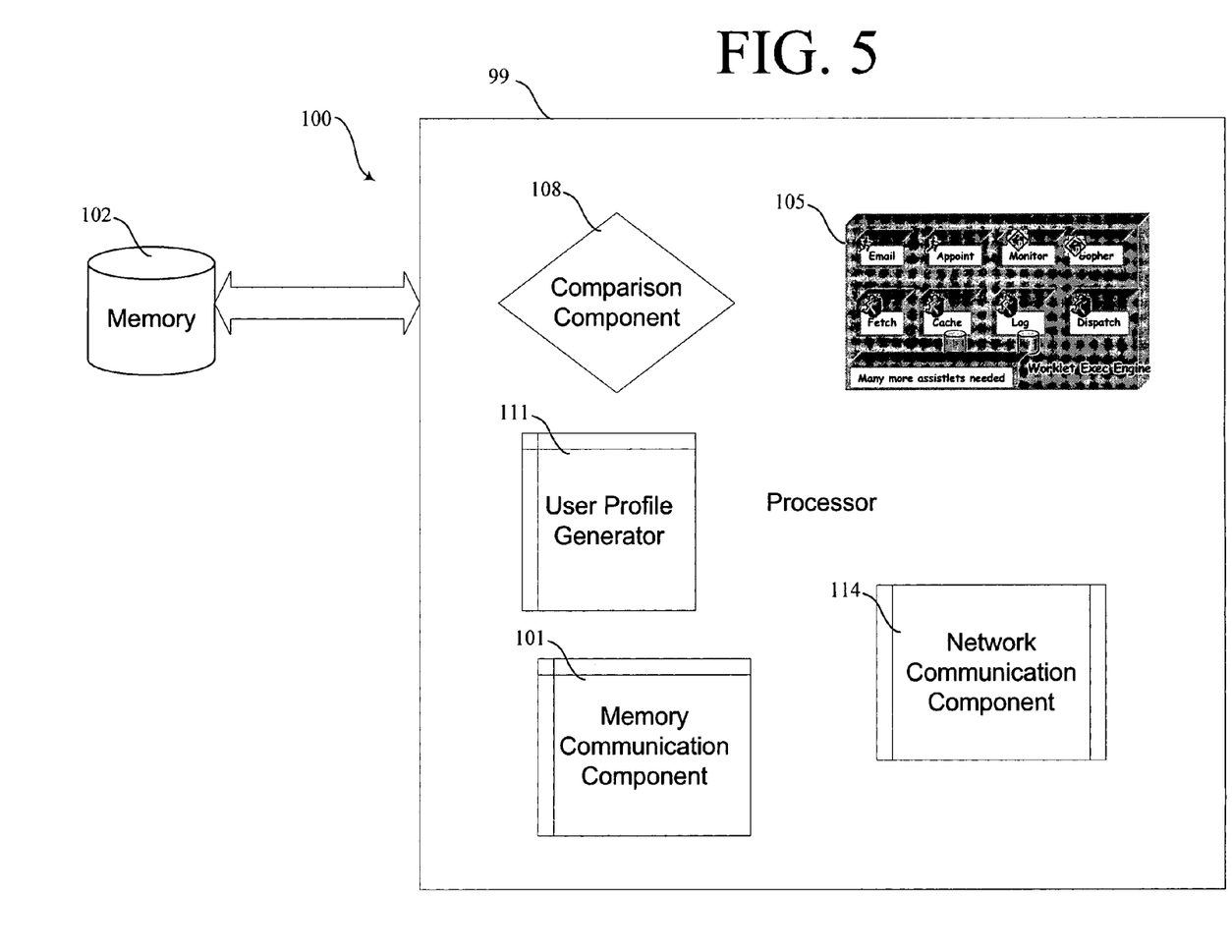

A processor embodiment 100 in accordance with an embodiment of the invention is shown in FIG. 5. A processor 99 in operative communication with a memory device 102 includes, in operative communication one with another, a storage access component 101 to retrieve from the machine-readable memory device 102 at least one ordered sequence of work phases; a comparison component 108 to compare user-directed operations of the processor to the retrieved ordered sequence of work phases; a user profile generator 111 configured to construct a user profile; a network communication component 114 configured to communicate across an intermittent network link to a server located remotely from the processor; and, optionally, an execution component 105 for executing at least one of the ordered sequences of assistlets. The processor embodiment 110 is exemplary of the run time architecture 50*b* of the software described in FIG. 4.

The storage access component 101 retrieves worklet models 11 from a machine-readable memory device 102 for comparison with such other work as a user directs. As set forth above, the storage access component 101 facilitates retrieval of worklet models 11 from the memory device 102 according to worklets executed by the processor 99. In one embodiment, streaming recall occurs at the storage access component with suitable filtration of the stream according to the observed execution of worklets. In an alternate embodiment, work is retrieved according to requests sent to the storage access component 101 according to worklets executed at the processor 99.

The comparison component 108 compares user-directed operations of the processor 99 to the retrieved worklets in order to determine which worklets are executed by the processor 99 and, in one embodiment, to instruct the storage access component 101 according to actions of the processor 99.

The user profile generator 111 constructs and manages a user profile that is configured to preserve information indicative of user habits according to worklets executed by the processor. Worklets regularly used by the user will be stored in the user profile in association with the user's identity. The user profile generator 111 assists in the predictive caching by assuming that the user will suitably repeat patterns of execution of worklets. Assuming further that in many instances execution of worklets is a function of user responses to conditions in the users environment, monitoring such functions of the processor 99 as CDMA functions in a cell phone to call or to receive a call to or from a particular telephone number, appointment codes in a PIM, a location of a wireless connection to a server, GPS information, or even the day and hour of a week. According to the user profile generator 111, and the operation of processor 99, specifically comparison component 108, calls for specific data for recharging the cache 66*a* (FIG. 4), on the memory device 102, are suitably predictive to provide the user with data needed.

The network communication component 114 is configured to communicate across an intermittent network link to a server located remotely from the processor. The network communication component 114 performs the actual recharge of the cache 66*a* (FIG. 4) according the operation of the comparison component 108. The network communication component 114 establishes the wireless connection between the data cache 66*a*, on the memory device 102, and conducts the recharge of the cache 66*a* according to priorities for data recharge.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A processor-implemented method comprising:
determining an access history in a computer from a workflow model of user and computer tasks, the workflow model including a plurality of ordered sequences of work phases, each work phase including at least one worklet object corresponding to a user task and at least one transition object; and
using the access history to recharge data in the computer.

2. The method of claim 1, wherein
wherein at least one of the worklet objects has a boundary and includes at least one input data class, and at least one output data class, and a processor-executable script configured to act upon the at least one input data class to produce the at least one output data class; and
wherein at least one of the transition objects includes a decision gate succeeding each work phase, the decision gate allowing progress out of the boundary upon satisfaction of a boundary condition; and comparing user-directed operations of the computer to the ordered sequence of work phases to determine and an occurrence of the ordered sequence of work phases.

3. The method of claim 2, further comprising executing at least one of the ordered sequences, the ordered sequences in response to an activation signal associated with the ordered sequence.

4. The method of claim 3, further comprising initiating the activation signal in response to a user input.

5. The method of claim 3, further comprising initiating the activation signal in response to execution of a user configured script.

6. The method of claim 1, wherein the workflow model further includes priority scores for input classes and output classes associated with each worklet object.

7. The method of claim 6, wherein the recharging includes communicating across an intermittent network link to a server; and synchronizing data residing on the server according to the priority scores in the workflow model.

8. The method of claim 1, wherein the workflow model further includes assistlets, each assistlet corresponding to a computer task.

9. The method of claim 8, wherein user tasks are compared to retrieved worklet objects to determine which worklet objects are executed; and wherein predictive caching is based on repeated patterns of user tasks.

10. An apparatus comprising a processor and memory encoded with a workflow model of user and processor tasks, the workflow model including a plurality of ordered sequences of work phases, each work phase including at least one worklet object corresponding to a user task and at least one transition object the memory further encoded with data that, when executed, causes the processor to determine an access history from the workflow model, and use the access history to perform data recharging.

11. The apparatus of claim 10, wherein the processor retrieves an ordered sequence of work phases, each work phase including:

wherein at least one worklet object has a boundary and includes at least one input data class, and at least one output data class, and a processor-executable script configured to act upon the at least one input data class to produce the at least one output data class; and wherein at least one transition object includes a decision gate succeeding each work phase, the decision gate allowing progress out of the boundary upon satisfaction of a boundary condition; and comparing user-directed operations of the processor to the ordered sequence of work phases to determine an occurrence of the ordered sequence of work phases.

12. The apparatus of claim 11, wherein the processor executes the ordered sequences in response to an activation signal associated with the ordered sequence.

13. The apparatus of claim 12, wherein the activation signal is initiated in response to a user input.

14. The apparatus of claim 12, wherein the activation signal is initiated in response to execution of a user configured script.

15. The apparatus of claim 10, wherein the processor constructs the workflow model from a group of worklet objects and priority scores for input classes and output classes included with each worklet object.

16. The apparatus of claim 15, wherein the processor communicates across an intermittent network link to a server and synchronizes data residing on the server according to the priority scores in the workflow model.

17. The apparatus of claim 10, wherein the workflow model further includes assistlets, each assistlet corresponding to a processor task.

18. The apparatus of claim 17, wherein user tasks are compared to retrieved worklet objects to determine which worklet objects are executed; and wherein predictive caching is based on repeated patterns of user tasks.

19. A processor-implemented method comprising:
determining an access history in a computer from a workflow model of user and computer tasks, the workflow model including a plurality of ordered sequences of work phases, each work phase including at least one worklet object corresponding to a user task and at least one transition object;
comparing user-directed operations of the computer to the ordered sequence of work phases to anticipate caching needs of the computer; and
recharging data in the computer according to the anticipated caching needs.

20. The method of claim 19, wherein the workflow model further includes priority scores for input classes and output classes associated with each worklet object.

* * * * *